United States Patent [19]

Merkenich et al.

[11] Patent Number: 5,478,590
[45] Date of Patent: Dec. 26, 1995

[54] USE OF ACIDIC SODIUM POLYPHOSPHATES FOR THE PRODUCTION OF CHEESE

[75] Inventors: Karl Merkenich, Fuerth/Fahrenbach; Andrea Maurer-Rothmann, Waibstadt-Daisbach; Guenter Scheurer, Hassloch; Richard Taenzler, Laudenbach, all of Germany

[73] Assignee: BK Ladenburg GmbH, Ladenburg, Germany

[21] Appl. No.: 193,011

[22] PCT Filed: Jul. 8, 1992

[86] PCT No.: PCT/EP92/01533

§ 371 Date: Aug. 15, 1994

§ 102(e) Date: Aug. 15, 1994

[87] PCT Pub. No.: WO93/03623

PCT Pub. Date: Mar. 4, 1993

[30] Foreign Application Priority Data

Aug. 24, 1991 [DE] Germany ............... 41 28 124.1

[51] Int. Cl.⁶ .............. A23C 19/02; A23C 19/082; A23C 19/068
[52] U.S. Cl. ............... 426/582; 426/36; 426/39
[58] Field of Search ................ 426/582, 36, 39

[56] References Cited

U.S. PATENT DOCUMENTS

| | | | |
|---|---|---|---|
| 2,774,672 | 12/1956 | Griffith | 426/623 |
| 3,982,025 | 9/1976 | Hashimoto et al. | 426/46 |
| 4,053,643 | 10/1977 | Corbin, Jr. | 426/40 |
| 4,347,258 | 8/1982 | Merkenich et al. | 426/582 |

OTHER PUBLICATIONS

The Condensed Chemical Dictionary, 7th Edition 1966.
Chemical Dictionary, Grant & Hackh's 5th Edition, 1987.
Food Chemicals Codex, "Sodium Polyphosphates, Glassy", pp. 295, 296, (1981).

*Primary Examiner*—Jeanette Hunter
*Assistant Examiner*—Choon P. Koh
*Attorney, Agent, or Firm*—Foley & Lardner

[57] ABSTRACT

The invention concerns the use of acidic sodium polyphosphates and Maddrell's salt for the production of natural cheese, processed cheese and cheese preparations which have a $P_2O_5$ content of 73–77 wt. %, on $Na_2O$ content of 20–25 wt. %, a water content of 2–3 wt. % and an average linear degree of condensation of 8–20. Preferred are the polyphosphates which are present as comparatively long chains (catena compounds) which are possible cross-linked and contain sodium metaphospbates (tri- and tetra-phosphates) in below 2 wt. %.

12 Claims, 1 Drawing Sheet

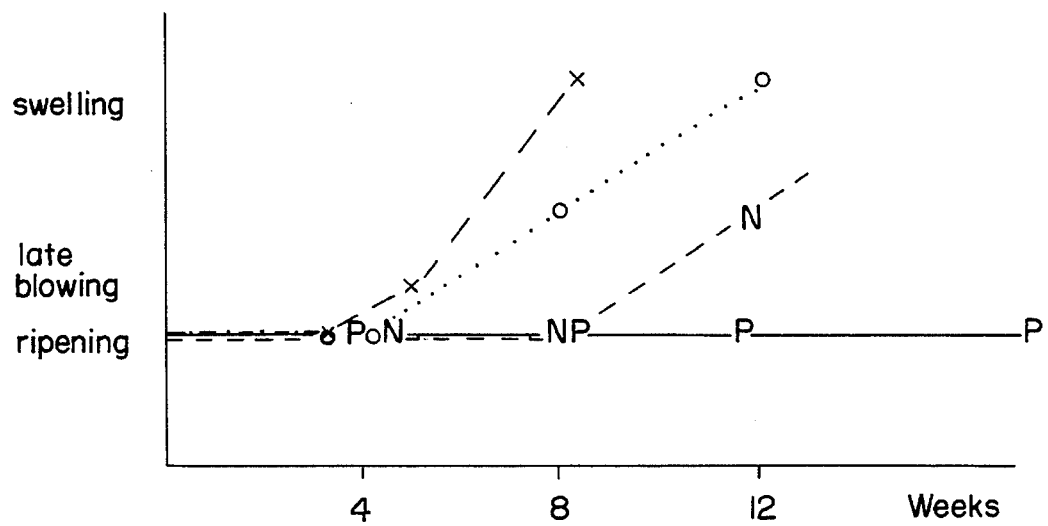
Figure

USE OF ACIDIC SODIUM POLYPHOSPHATES FOR THE PRODUCTION OF CHEESE

FIELD OF THE INVENTION

The subject of the invention is the use of acidic sodium polyphosphates for the production of natural cheese, processed cheese and cheese preparations.

DESCRIPTION OF RELATED ART

Phosphates are already used to a wide extent in the foodstuff industry and also in the cheese industry. In the cheese industry, as processing salts there are especially used orthophosphates, pyrophosphates and tripolyphosphates and highly condensed polyphosphates with $P_2O_5$ contents of 60–70 wt. % with sodium, potassium or calcium as cations. It is known that these compounds possess a certain anti-bacterial action, especially against gram-positive bacteria, and thus can be used as preserving agents for foodstuffs. An anti-oxidative action for meat and meat products is also known. Such polyphosphates are also used as processed cheese additives and as stabilisers in the production of condensed milk.

In the case of the polyphosphates, a differentiation is to be made between the chain-shaped ones, systematically designated as catens polyphosphates, and the ring-shaped cyclopolyphosphates, which are frequently also referred to as metaphosphates. The production of a series of defined acidic metaphosphates with $P_2O_5$ contents of 75–78 wt. % and $Na_2O$ contents of 24–17 wt. % and water contents of 2–6 wt. % is described in U.S. Pat. No. 2,774,672, according to which these products can be used as bakery rising agents. This patent specification also gives the phase diagram for sodium phosphate/phosphoric acid mixtures in dependence upon the temperature.

According to the Food Chemical Coder (FCC III), polyphosphates and metaphosphates are legally permitted for foodstuff purposes when they have $P_2O_5$ contents of 60–71 wt. %.

SUMMARY OF THE INVENTION

Surprisingly, it has now been ascertained that acidic sodium polyphosphates with $P_2O_5$ contents of 70.6–77 wt. % and sodium oxide contents of 20–27 wt % which also have a residual water content of about 2–3 wt. % can be used with great success not only as processing adjuvents but also as stabilising agents in the cheese industry.

DETAILED DESCRIPTION

The polyphosphates preferably have a $P_2O_5$ content of 71–73 wt. %. Polyphosphates with a $P_2O_5$ content of 70.0 or below are practically useless as stabilising agents. Hitherto, it has not been known upon what this sudden change of action depends.

For a use of the polyphosphates as processing salt, a content of about 2–4 wt. % of the processing is necessary. However, since these compounds are relatively acidic, it is preferred, in addition to the polyphosphates, to use other known processing salts, such as trisodium citrate or trisodium phosphate, in an amount of 0.5–2 wt. % and correspondingly to reduce the content of polyphosphates according to the invention to 0.1–1 wt. %.

The stabilising and preserving action according to the invention occurs at a concentration of 0.1–0.5 wt. % of the cheese mass. Since the phosphates according to the invention, in the case of addition to dairy milk, accumulate on the protein and are precipitated with this, the phosphates according to the invention can also already be added to the dairy milk in an amount of 0.001–0.05 wt. %, preferably of 0.003–0.01 wt. %. The nitrates previously added as stabilisers to dairy milk, which are hazardous to health, can then be dispensed with.

Furthermore, in addition to the polyphosphates, it has proved to be advantageous also to add a proportion of 0.1–10 wt. parts of Maddrell's salt per part of polyphosphate, whereby, in the case of almost equally good processing salt and stabilising action, the acidity of the mixture is considerably lowered.

Acidic polyphosphates which are used according to the invention are preponderantly chain-shaped condensation products with average chain lengths of about 8–20 which are partly also cross-linked but only to a small extent, i.e. contain an amount of less than 2 wt. % of sodium trimetaphosphate and sodium tetrametaphosphate. The above-defined water is statistically bound chemically in the form of hydroxyl groups to the phosphate chains and has the result that the compounds react relatively strongly acidically when they are dissolved in water, whereby the 5 wt. % solution displays a pH value of about 1.5–2.5.

The compounds are very hygroscopic and must, therefore, be stored with the exclusion of moisture in order that they do not clump together. Like all polyphosphates, they undergo a slow hydrolysis in aqueous solution. Chromatographic analysis shows that, in the case of these products, it is not a question of definite compounds but rather of mixtures in which, of low to high molecular condensation products, practically all are present. The average degree of polymerisation can thereby be adjusted to a certain extent by the above-described process procedure.

The dissolving behaviour of the substance in water has a maximum at a phosphate content of about 77 wt. % $P_2O_5$ and becomes the better the higher is the water content, that is the content of free hydroxyl functions, whereby, at the same time, the degree of cross-linking is also correspondingly small. However, products with increased content of free hydroxyl functions show increasing hygroscopicity and, especially at high temperature, attack metallic surfaces, which can give problems in the case of grinding and working up.

The content of water or of free hydroxyl functions is expediently determined by determination of the heating loss with the addition of calcined ZnO.

The polyphosphates cross-linked with the further loss of water, which in the literature are frequently also designated as sodium ultrametaphosphates, dissolve only slowly in water with decrease of the pH value of the solution. Therefore, they are less suitable according to the invention and should only be present in the phosphates in minor amount.

The acidic sodium polyphosphates used according to the invention can be prepared according to known methods for the production of processing phosphates under suitable temperature and mixing conditions (cf. U.S. Pat. No. 2,774,672). On a laboratory scale, mixtures of monosodium phosphate and phosphoric acid are melted in a platinum crucible in a muffle furnace and quenched on a stainless steel surface. On a technical scale, the products are melt produced in a chamber oven continuously or discontinuously from monosodium phosphate with a definite excess of free phosphoric acid or directly from an adjusted suspension of caustic soda solution and phosphoric acid. The properties and the dissolving behaviour of the products can be controlled by the adjustment of the ratio of the caustic soda solution to the phosphoric acid, of the residence and of the melt temperatures. From the phase diagram in U.S. Pat. No. 2,774,672, which is attached as FIG. 1, it can be seen that, for the products according to the invention with 20–27 wt. % $Na_2O$, 70–77 wt. % $P_2O_5$ and 2–3 wt. % of water, reaction temperatures of above 400° C. are necessary. A temperature of 400°–500° C. is preferred. Depending upon the batch size and the continuous or discontinuous process procedure, residence times of 20 minutes to about 2 hours, preferably about one hour, are necessary in order to carry out the condensation to the desired extent and to evaporate off the water thereby resulting. Subsequent to the melting, the whole mixture is poured on to cooled metal surfaces, for example appropriate stainless steel rollers with internal water cooling, whereby the material solidifies to a colourless, translucent phosphate glass which is first coarsely broken up and then finely ground in appropriate mills. The material is hygroscopic so that, during the whole of the working up process, atmospheric moisture must be excluded. Tightly closed containers are also to be used for the storage since otherwise the product hardens completely.

In the following Examples, the production of the polyphosphates and the novel use thereof is described in more detail without the invention thereby being limited.

EXAMPLE 1

Acidic Sodium Polyphosphate 100 kg of monosodium phosphate (anhydride) and 36 l of 83 wt. % phosphoric acid (=60 kg)(Na/P=0.62) are homogenized and filled into a discontinuous chamber oven preheated to 600° C. One heats the mixture for about 60 minutes to a melt temperature of 400° C. (bath temperature). The melt surface still clearly shows bubble formation of emergent water of condensation. Subsequently, one runs off the clear melt on to a cold casting ingot mould. Upon cooling, the material becomes bubble-free and completely glass-clear transparent. The material is subsequently removed from the casting ingot mould, broken up, ground and stored in airtight containers.

pH value: 1.7 (5 wt. % solution)
$P_2O_5$ content: 77.0 wt. %
$Na_2O$ content: 20.55
$H_2O$: 2.45

EXAMPLE 2

Sodium Polyphosphate 50 wt. % caustic soda solution and 83 wt. % phosphoric acid are passed continuously, in the ratio of Na/P=0.73, via two measuring pumps and separate pipes, into a reaction container. There results a hot suspension of partly neutralised orthophosphoric acid which is subsequently passed into a directly heated chamber oven. The heating of the chamber oven is regulated via the off-gas temperature and is maintained at 500° C. The suspension passes, with condensation, through the chamber oven with an average residence time of about 2 hours. The completely reacted melt phosphate is continuously removed at the end of the oven via an overflow channel into a water-cooled cooling drum. The material there solidifies to a glass, is subsequently broken up and ground. The filling takes place into airtight barrels, taking care for dry storage.

pH value: 1.9
$P_2O_5$ content: 73.0 wt. %
$Na_2O$ content: 24.2
$H_2O$ content: 2.8
solubility: 90 minutes (stirred 5 wt. % solution) clearly dissolved
heating loss: 2.0 wt. %
Raw materials used:
1) Thermal phosphoric acid (83 wt. %)
Production by burning of elementary phosphorus and adsorption of the resulting phosphorus pentoxide in phosphoric acid with continuous dilution to a definite density by addition of deionised water.
Product data:
density (25° C.): 1.664 g/ml
$P_2O_5$: 60.1 wt. %
As: <0.5 ppm, typically 0.1 ppm
F: <10 ppm
heavy metals: <20 ppm
copper: <10 ppm
zinc: <3 ppm
$H_3PO_4$: <0.1 wt. %
lead: <1 ppm
2) Caustic soda solution (50 wt. %)
density: 1.52 g/l
content: 50.0 wt. %
Hg: <1 ppm
Al: <10 ppm
iron: <3 ppm
chloride: <10 ppm
potassium: <50 ppm
arsenic: <0.3 ppm

EXAMPLE 3

Production of Slicable Cheese 3000 kg of milk with a protein content of 3.4 wt. % and a fat content of 3.1 wt. % are pasteurised at 71°–74° C., cooled to 28°–32° C. and mixed with about 10 l of an acidification culture (0.15–0.5 wt. %), 600 g calcium chloride, 300 ml of rennet extract (1:10,000) and, instead of the usual sodium nitrate (600 g), with 150 g of sodium polyphosphate according to Example 1. After a coagulation and thickening phase of about 1 hour, it is converted into cheese in several steps and whey is drawn off. After about 2 hours, broken pieces of fresh cheese of about millet seed size are obtained.

The pieces of cheese are filled into round pressing moulds (9–10 kg) and pressed with 6–8 kg/cm$^2$ at 17°–18° C. for 4 hours.

The final whole cheeses are salted in a salt bath of 24 wt % NaCl at 12°–15° C. for 3–5 days and ripened at 14°–16° C. for 2–3 months. Thereafter, either oil is rubbed into the cheese or the cheese is coated with wax and further ripened for 2–3 months at 5°–10° C.

EXAMPLE 4

Production of Spreadable Processed Cheese

Processed cheese 45 wt. % of fat in the dry weight, spreadable 15.0 kg Emmentaler 6.0 kg Chester 2.0 kg Tilsiter 2.5 kg whey powder 3.0 kg butter 2.0 kg premelt goods 0.85 Na polyphosphate (60 wt. % $P_2O_5$)

0.14 kg Na polyphosphate according to Example 2 22.6 kg water

The above products are mixed together in a stirrer vessel and, with slow stirring, heated up with the passing through of steam in about 10–20 min to the melt temperature of 90°–92° C. Thereafter, it is homogenised with vigorous stirring, the mass poured into moulds, cooled to room temperature and temporarily stored for 12 hours. The final storage up to use takes place at 6° C.

There is obtained a spreadable processed cheese which contains 46 wt. % of fat in the dry weight in case of a total dry weight of 46 wt. %. Appearance and consistency do not change even after a storage period of 4–6 months.

EXAMPLE 5

Product of Processed Cheese from Fresh Cheese (70 wt. % of fat in the dry weight)

30.0 kg fresh cheese (according to Example 3)

0.45 kg processing salt (trisodium citrate/sodium polyphosphate—60 wt. % $P_2O_5$)

0.1 kg citric acid 0.1 kg sodium polyphosphate according to Example 2

1.0 kg Na caseinate 2.0 kg butter 2.0 kg water are heated in 10 min to about 90° C. by passing through of steam and further worked up according to Example 4. In spite of the small processing salt content, a satisfactory processed cheese is obtained which is unchanged even after a storage period of 6 months.

EXAMPLE 6

Production of Slicable Cheese 3000 kg of milk with a protein content of 3.4 wt. % and a fat content of 3.1 wt. % are pasteurised at 71°–74° C., cooled to 28°–32° C. and mixed with about 10 1 of an acidification culture (0.15–0.5 wt. %), 600 g of calcium chloride, 300 ml of rennet extract (1:10,000) and, instead of the usual sodium nitrate (600 g), with 150 g of a mixture of 90% Maddrell and 10% P71 according to Example 1.

After a coagulation and thickening time of about 1 hour, it is converted into cheese in several steps and the whey drawn off. After about 2 hours, there are obtained pieces of fresh cheese of approximately millet seed size.

The pieces of cheese are filled into round pressing moulds (9–10 kg) and pressed with 6–8 kg/cm² at 17°–18° C. for 4 hours.

The final whole cheeses are salted in a salt bath of 24 wt. % NaCl at 12°–15° C. for 3–5 days and ripened at 14°–16° C. for 2–3 months. Thereafter, either oil is rubbed into the cheese or the cheese is coated with wax and further ripened for 2–3 months at 5°–10° C.

EXAMPLE 7

Production of Spreadable Processed Cheese

Processed cheese with 45 wt. % fat in the dry weight, spreadable 15.0 kg Emmentaler 6.0 kg Chester 2.0 Tilsiter 2.5 kg whey powder 3.0 kg butter 2.0 kg premelt goods 0.10% Maddrell 0.90% P71 (na polyphosphate with $P_2O_5$ 71%) 22.6 kg water The above products are mixed together in a stirrer vessel and, while stirring slowly, heated up in about 10–20 minutes to the melt temperature of 90°–92° C. by passing through of steam. Thereafter, it is homogenised by vigorous stirring, the mass is poured into moulds, cooled to room temperature and temporarily stored for 12 hours, the final storage until use takes place at 6° C.

A spreadable processed cheese is obtained which contains 46 wt. % of fat in the dry material in the case of a total dry weight of 46 wt. %. Even after a storage time of 4–6 months, appearance and consistency do not change.

EXAMPLE 8

Production of Processed Cheese from Fresh Cheese (70% wt. % of fat in the dry material)

30.0 kg fresh cheese (according to Example 3)

0.45 kg processing salt (trisodium citrate/sodium polyphosphate—60 wt. % $P_2O_5$)

0.1 kg citric acid 0.1 kg sodium polyphosphate according to Example 7

1.0 kg Na caseinate 2.0 kg butter 2.0 kg water are heated to about 90° C. by passing through of steam for 10 min and further worked up according to Example 4. In spite of the small processing salt content, a satisfactory processed cheese is obtained which, even after storage period of 6 months, is unchanged.

In the above Examples, all statements of percentage refer to percentages by weight insofar as nothing otherwise is stated.

EXAMPLE 9

Investigation of the ripening behaviour

Cuttable whole cheeses (Gouda type) produced according to Example 3 or 6 are compared with corresponding whole cheeses which contain no stabiliser, nitrate as stabiliser or polyphosphate with a $P_2O_5$ content of below 70%.

According to Example 3, $P_2O_5$ contents of 70.5, 73 and 76 were tested.

According to Example 6, 90% of Maddrell'salt was mixed with 10% polyphosphate with a $P_2O_5$ content of 70.5, 73 and 76%.

Sodium nitrate was added in an amount of 10 g/ 100 l of dairy milk.

As polyphosphate comparison, there were used polyphosphates with $P_2O_5$ contents of 60; 64; 68 and 70% in an amount of 0.25–1.0 g/l of dairy milk.

The ripening was observed over a period of 13 weeks. The results are given in the accompanying Figure, whereby, by late blowing is understood an inflation of the wax covering and by swelling a tearing due to excessive blowing. The curve of the product according to the invention is designated with P, that with nitrate with N, the control with x and that with processing phosphate with O. The various phosphate mixtures thereby give identical curves.

Results:

1. The addition of the polyphosphates P 60–P 70 show, not only in the case of addition to dairy milk but also in the case of use in the washwater in the case of use in natural cheese, no influence on the formation of anaerobic micro-organisms. Natural cheese which have been treated with these polyphosphates already show after 4 weeks faulty fermentation or late blowing, as is also more strongly the case in the zero experiment (without nitrate or polyphosphate addition).

2. After a storage time of 8–12 weeks, cheese treated with nitrate also show indications of a faulty fermentation which is brought about by the development of anaerobic micro-organisms.

3. All cheese which have been produced with the addition of the polyphosphates P 70.5, P 73, P 76 and mixtures of Maddrell/P 70.5, Maddrell/P 73, Maddrell/ P 76 (ratio 90/10), as well as Maddrell, showed, even after 13 weeks storage period, no indication of a faulty fermentation or late blowing.

We claim:

1. A method of making natural cheese or processed cheese or cheese preparations from cheese raw mass, comprising the step of adding to said cheese raw mass an acidic sodium polyphosphate, wherein said acidic sodium polyphosphate has a $P_2O_5$ content within the range of from 70.5 to 77 wt %, an $Na_2O$ content within the range of from 20 to 27 wt %, a water content within the range of from 2 to 3 wt % and an average linear degree of condensation within the range of from 8 to 20.

2. The method as claimed in claim 1, wherein said polyphosphates are present as comparatively long chain catena compounds which are optionally cross-linked, and wherein said polyphosphates contain less than 2 wt % of sodium metaphosphates.

3. The method as claimed in claim 1, wherein said polyphosphates have a $P_2O_5$ content of from 71 to 75 wt % and an $Na_2O$ content of from 22 to 26 wt %.

4. The method as claimed in claim 1, wherein said method produces cuttable cheese, said cheese raw mass includes milk, and wherein said method comprises the addition of, per liter of milk, from 0.001 to 0.05 wt % of polyphosphate.

5. The method as claimed in claim 4, wherein said method comprises the addition of, per liter of milk, from 0.003 to 0.01 wt % of polyphosphate.

6. The method as claimed in claim 1, wherein said method produces processed cheese, and wherein said method comprises the addition of, to said cheese raw mass, from 2 to 4 Wt % of polyphosphate.

7. The method as claimed in claim 6, wherein said method comprises the addition of, to said cheese raw mass, from 0.1 to 1 wt % of polyphosphates in combination with other processing salts.

8. The method as claimed in claim 7, wherein said method comprises the addition of, to said cheese raw mass, 0.5 wt % of polyphosphates in combination with other processing salts.

9. The method as claimed in claim 1, wherein said method produces cheese preparations from fresh cheese mass, said method being further characterized by the addition of from 0.1 to 0.5 wt % of said polyphosphate to said mass.

10. The method as claimed in claim 1, wherein from 0.1 to 10 parts by weight of Maddrell's salt are present per 1 part by weight of said polyphosphate.

11. The method as claimed in claim 1, wherein said method produces natural cheese, and wherein from 0.1 to 1 parts by weight of Maddrell'salt are present per 1 part by weight of said polyphosphate.

12. The method as claimed in claim 11, wherein said method produces processed cheese, and wherein from 1 to 10 parts by weight of Maddrell's salt are present per 1 part by weight of said polyphosphate.

* * * * *